(12) United States Patent
Kamiya et al.

(10) Patent No.: US 6,697,938 B1
(45) Date of Patent: Feb. 24, 2004

(54) MICROCOMPUTER EXECUTING AN ORDINARY BRANCH INSTRUCTION AND A SPECIAL BRANCH INSTRUCTION

(75) Inventors: Masahiro Kamiya, Nishio (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 595 days.

(21) Appl. No.: 09/598,320

(22) Filed: Jun. 21, 2000

(30) Foreign Application Priority Data

Jun. 23, 1999 (JP) .......................................... 11-177065
May 24, 2000 (JP) ...................................... 2000-152590

(51) Int. Cl.$^7$ ................................................. G06F 9/32
(52) U.S. Cl. ...................................... 712/242; 712/243
(58) Field of Search .................................. 712/242, 243, 712/245, 248, 220, 230, 233, 234, 238, 240; 711/202, 208, 209, 215, 125, 126, 213

(56) References Cited

U.S. PATENT DOCUMENTS

| | | | | |
|---|---|---|---|---|
| 3,366,929 A | * | 1/1968 | Mullery et al. | 712/242 |
| 4,285,036 A | * | 8/1981 | Kitagawa et al. | 712/242 |
| 4,363,091 A | | 12/1982 | Pohlman et al. | |
| 5,274,820 A | * | 12/1993 | Gillet | 717/139 |
| 5,313,634 A | * | 5/1994 | Eickemeyer | 712/240 |
| 5,717,946 A | * | 2/1998 | Satou et al. | 712/225 |
| 5,721,945 A | * | 2/1998 | Mills et al. | 712/35 |
| 5,864,689 A | * | 1/1999 | Tran | 712/208 |
| 5,935,241 A | * | 8/1999 | Shiell et al. | 712/240 |
| 5,987,589 A | * | 11/1999 | Kawasaki et al. | 712/32 |
| 6,070,220 A | * | 5/2000 | Katayama | 710/264 |
| 6,170,054 B1 | * | 1/2001 | Poplingher | 712/242 |

FOREIGN PATENT DOCUMENTS

| | | |
|---|---|---|
| JP | 4-305736 | 10/1992 |
| WO | WO 9926135 | 5/1999 |

OTHER PUBLICATIONS

B. Calder et al., "Fast and Accurate Instruction Fetch and Branch Prediction," *IEEE*, pp. 2–11 (Apr. 18, 1994).

* cited by examiner

Primary Examiner—Henry W. H. Tsai
(74) Attorney, Agent, or Firm—Posz & Bethards, PLC (57) ABSTRACT

A microcomputer has a built-in memory and is accessible to an external memory. The microcomputer executes a specific area branch instruction "JM" as an executable instruction. The specific area branch instruction "JM" is a branch instruction restricted to jump to only a specific area of a memory space and is a single instruction having a minimum instruction length. The microcomputer allocates at least one of a real arithmetic subroutine, an integer division subroutine, and a bit handling subroutine to the specific area. A program of this microcomputer is configured to jump to the selected subroutine allocated to the specific area in response to the specific area branch instruction "JM". Accordingly, the required program size can be reduced. When the programs are stored in the external memory, it becomes possible to suppress an increase of the execution time which is required for invoking each of the subroutines.

19 Claims, 5 Drawing Sheets

MICROCOMPUTER EXECUTING AN ORDINARY BRANCH INSTRUCTION AND A SPECIAL BRANCH INSTRUCTION

BACKGROUND OF THE INVENTION

The present invention relates to a microcomputer which executes various instructions of a program stored in its built-in memory or in an external memory.

For example, a microcomputer executes a real arithmetic operation (i.e, a calculation using real numbers). In this case, one method is to incorporate an auxiliary arithmetic unit to the microcomputer, wherein the auxiliary arithmetic unit is dedicated to the real arithmetic processing. Another method is to perform software calculations based on a plurality of CPU instructions. The former method is not preferable in that the chip size becomes large and the cost increases due to addition of the hardware dedicated to the real arithmetic processing. Accordingly, the latter method is generally preferable.

In view of the above, a conventional microcomputer runs a real arithmetic processing program as a subroutine, so that the microcomputer when executing a main routine or the like can jump to this subroutine (in other words, so that the microcomputer can invoke the real arithmetic subroutine) to execute the real processing.

However, a recently used RISC computer, i.e., a reduced (or restricted) instruction set computer, implements a branch or a jump to the subroutine in accordance with a plurality of instructions or in accordance with a long instruction whose length is longer than a minimum instruction length. The minimum instruction is shortest in bit length. For example, the long instruction is not less than 4 bytes when the minimum instruction is 2 bytes.

In general, a branch instruction, used for jumping to a subroutine, is set to be able to jump to an arbitrary address in an entire memory space. To this end, the bit length of an address portion in this branch instruction tends to be long. The address portion in a branch instruction is called "operand" which is a data portion representing the branch address. This is why a plurality of instructions or a long instruction is required in executing a branch instruction in the above-described RISC computer. The memory space is an address space accessibly by the microcomputer.

Accordingly, conventional microcomputers had to handle an increased number of programs. As a result, there was a tendency that their built-in memories cannot store all of the necessary programs.

Increase of the overall program size may be absorbed by an external memory provided outside the microcomputer. However, rapid speed-up of computations required in recent microcomputers tends to negate the use of such external memories because the external memories are slow in their response speeds compared with those of the built-in memories. In other words, accessing the external memories inevitably results in a relatively long time required for outputting an address to an address bus and for accomplishing reading of data. Thus, when the programs are stored in an external memory, a long time is necessary to accomplish the processing for invoking or calling the real arithmetic subroutine. In other words, the ability to execute the real arithmetic subroutine is decreased.

As described above, an ordinary branch instruction has a length longer than the minimum instruction length. Thus, completely reading the branch instruction requires a plurality of accesses to the memory. As described above, the external memories are slow in their response speeds. Therefore, in accordance with the number of accesses to the external memory, the processing time becomes more longer in accomplishing the reading and execution of the branch instruction. The start timing for the real arithmetic subroutine is delayed.

The above explanation is based on an example of the real arithmetic processing. Like the real arithmetic processing, the integer division processing and the bit data processing are executed in accordance with a software rather than using a dedicated hardware. Hence, the above-described problems will arise similarly in the integer division processing and in the bit data processing. The integer division processing is the arithmetic processing for dividing an integer by another integer. The bit data processing is the bit arithmetic processing using bit data.

SUMMARY OF THE INVENTION

In view of the above, the present invention has an object to provide a microcomputer capable of running a subroutine for executing at least one of the real arithmetic processing, the integer division processing and the bit data processing, wherein a required program size can be reduced and, when the programs are stored in an external memory, real time executability of each processing can be improved.

To accomplish the above and other related objects, the present invention provides a microcomputer including a built-in memory and having access to an external memory via a bus. The program to be executed in the microcomputer is stored in the built-in memory or in the external memory.

More specifically, the microcomputer of the present invention executes a specific area branch instruction as an executable instruction. The specific area branch instruction is a special branch instruction which is restricted to jump to only a specific area of a memory space and is a single instruction having a minimum instruction length.

Furthermore, the microcomputer of the present invention allocates a selected subroutine to the specific area of the memory. The selected subroutine is one of a real arithmetic subroutine for executing the real arithmetic processing, an integer division subroutine for executing the integer division processing, and a bit handling subroutine for executing the bit data processing. And, a program of the microcomputer is configured to jump to the selected subroutine (i.e., any one of the real arithmetic subroutine, the integer division subroutine, and the bit handling subroutine) allocated to the specific area in response to the specific area branch instruction.

As described above, the microcomputer of the present invention substantially restricts the jump area of the specific area branch instruction to the specific area in the entire memory space. The specific area branch instruction is a single instruction having the minimum instruction length. The subroutine, allocated to the specific area of the memory, is selected from the group consisting of the real arithmetic subroutine, the integer division subroutine, and the bit handling subroutine. The subroutine allocated to the specific area is invoked in response to the specific area branch instruction.

Accordingly, the microcomputer of the present invention can reduce the required program size to a level corresponding to the minimum instruction length, in invoking any one of the real arithmetic subroutine, the integer division subroutine, and the bit handling subroutine (or in branching to any one of these subroutines). As a result, the microcomputer can reduce the overall program size, thereby enabling its built-in memory to store all of the necessary programs. Alternatively, the present invention makes it possible to use a built-in memory having a smaller storage capacity.

As the specific area branch instruction has the minimum instruction length, only one access to the memory is required to read this instruction. In other words, the reading of the specific area branch instruction is accomplished within a single instruction reading cycle. When the programs are stored in an external memory, the microcomputer of the present invention can invoke any one of the real arithmetic subroutine, the integer division subroutine, and the bit handling subroutine with a minimum increase of the execution time. In other words, in starting each subroutine, the microcomputer of the present invention can suppress a delay time to a minimum level. And, the microcomputer of the present invention can improve the real time executability in each of the real arithmetic processing, the integer division processing, and the bit arithmetic processing.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

A preferred embodiment of the present invention will be explained hereinafter with reference to attached drawings.

Figure 1:
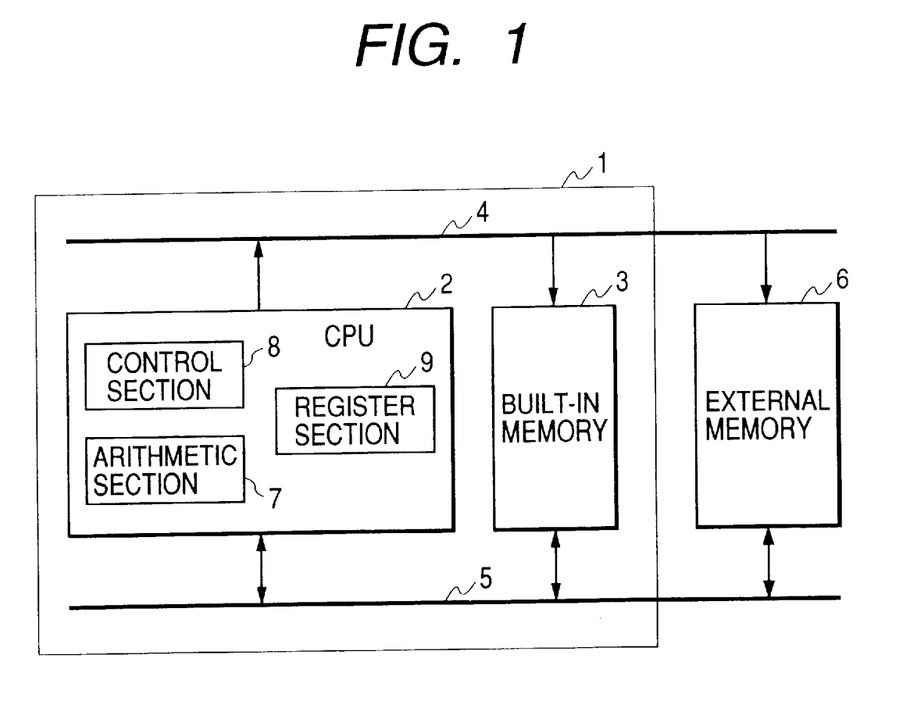
FIG. 1 is a block diagram showing an arrangement of a microcomputer in accordance with a preferred embodiment of the present invention.

FIG. 1 is a block diagram showing an arrangement of a RISC microcomputer 1 in accordance with the present invention.

As shown in FIG. 1, the microcomputer 1 of the preferred embodiment comprises a CPU 2 and a built-in memory 3. The CPU 2 comprises an arithmetic section 7 which performs various calculations (addition/subtraction, logic operation, shift operation etc.), a control section 8 which decodes instructions and controls the arithmetic section 7 to execute the various calculations, and a register section 9 comprising various registers and program counters. The built-in memory 3 stores programs to be executed in the CPU 2 as well as data referred to during the execution of these programs. The CPU 2 is connected to the built-in memory 3 via an address bus 4 and a data bus 5 which are provided in the microcomputer 1.

Furthermore, the microcomputer 1 of this embodiment is connectable with an external memory 6 via the address bus 4 and the data bus 5. In addition to the address bus 4 and the data bus 5, other control lines (not shown) extend out of the CPU 2. The microcomputer 1 has terminals (not shown) through which the buses 4, 5 and the control lines of the CPU 2 are further extendable out of the microcomputer 1. The external memory 6 is connectable to the address bus 4, the data bus 5, and the control lines thus extended out of the microcomputer 1.

Figure 2A:
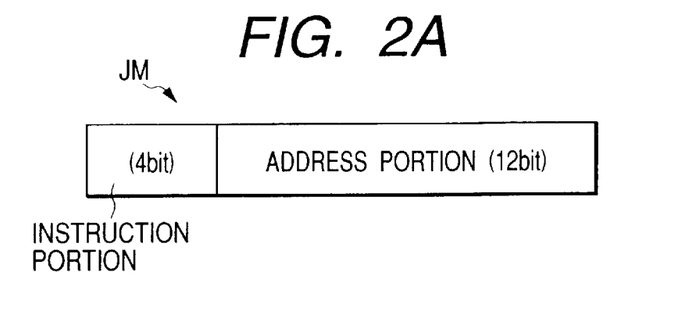
FIG. 2A is a view explaining a data stream of a specific area branch instruction in accordance with the preferred embodiment of the present invention.
Figure 2B:
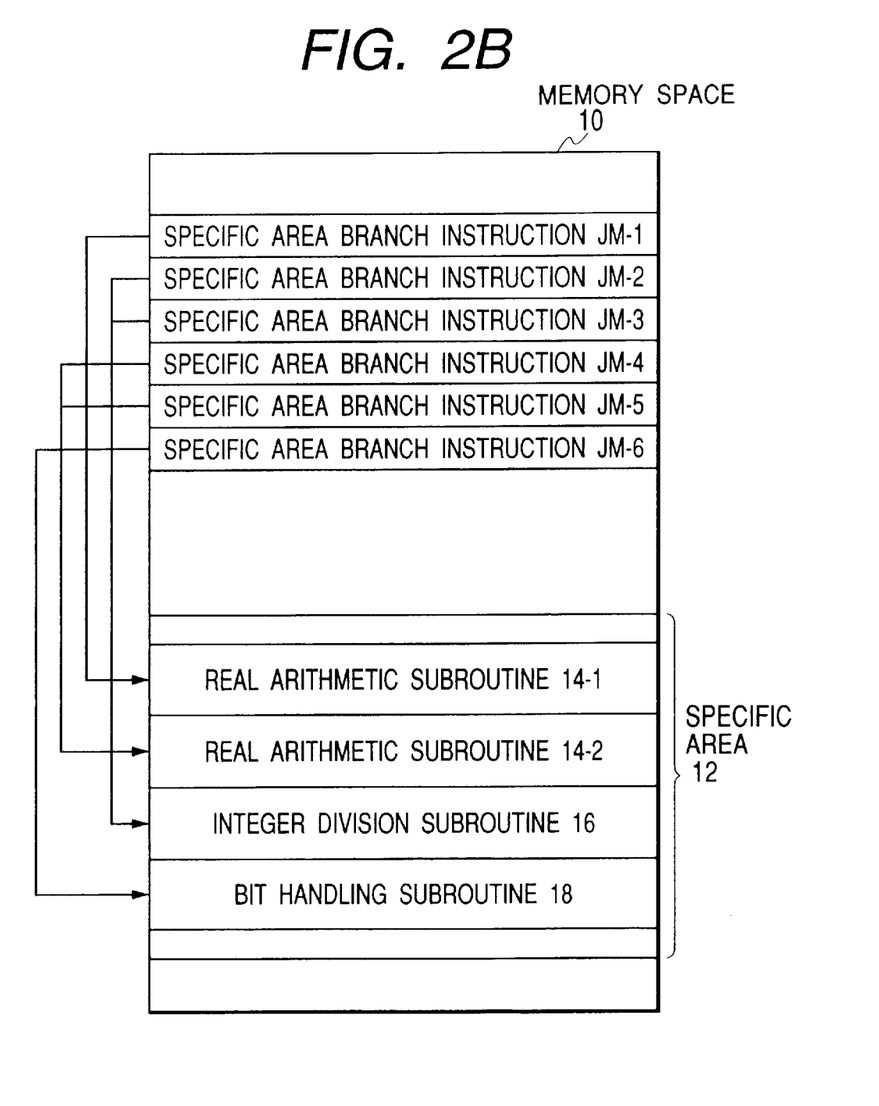
FIG. 2B is a view showing an allocation of specific area branch instructions in a memory in accordance with the preferred embodiment of the present invention.

Among the programs stored in the built-in memory 3 or in the external memory 6 (i.e., programs to be executed in the CPU 2), the microcomputer 1 of this embodiment handles each of a real arithmetic processing program, an integer division processing program, and a bit data processing program as a subroutine. The microcomputer, when executing other routine, can jump to (i.e., invoke) a subroutine to execute the designated processing. Especially, the microcomputer 1 of this embodiment executes a specific area branch instruction "JM" which serves as a branch instruction for invoking a designated subroutine. As shown in FIG. 2A, the branch instruction "JM" consists of an instruction portion of 4 bits (i.e., an instruction code section indicating the content of the designated processing) and a succeeding address portion of 12 bits (i.e., a data section indicating a branch address). The branch instruction "JM" is a single instruction having a minimum instruction length (2 bytes in this embodiment). As shown in FIG. 2B, the jump portion of each branch instruction "JM" is limited to a predetermined specific area 12 of a memory space 10.

More specifically, the control section 8 in the CPU 2 reads a specific area branch instruction "JM" from the built-in memory 6 or from the external memory 6. The specific area branch instruction "JM" comprises a predetermined data in its leading 4-bit portion. The control section 8 causes the arithmetic section 7 to calculate an address in the specific area 12. This address is designated by an address portion of the specific area branch instruction "JM." Then, the control section 8 causes the register section 9 to set the obtained address to a program counter in the register section 9. Thus, in the CPU 2, the processing procedure branches (jumps) to the obtained address of the specific area 12 designated by the address portion of the specific area branch instruction "JM." The microcomputer 1 of this embodiment obtains a 14-bit data by multiplying 4 with the 12-bit data constituting the address portion of the specific area branch instruction "JM." Then, a 10-bit data consisting of all "0" bits is added to a higher order side of the obtained 14-bit data. A 24-bit data thus obtained represents the branch address.

Furthermore, according to the microcomputer 1 of this embodiment, the programs to be executed in the CPU 2 are stored in the built-in memory 3 or in the external memory 6. FIG. 2B shows an allocation of instructions and subroutines in the memory space 10 including the specific area 12. Two real arithmetic subroutines 14-1 and 14-2 each executing the real arithmetic processing, an integer division subroutine 16 executing the integer division processing, and a bit handling subroutine 18 executing the bit data processing are respectively allocated to the specific area 12. Furthermore, the memory space 10 stores a plurality of specific area branch instructions JM-1 to JM-6 allocated in other routines. The processing procedure of CPU 2 branches to a corresponding one of the subroutines 14-1, 14-2, 16 and 18 in accordance with each of the specific area branch instructions JM-1 to JM-6.

More specifically, as shown in FIG. 2B, the specific area branch instruction JM-1 invokes the real arithmetic subroutine 14-1. Each of the specific area branch instructions JM-4 and JM-5 invokes the other real arithmetic subroutine 14-2. Each of the specific area branch instructions JM-2 and JM-3 invokes the integer division subroutine 16. The specific area branch instruction JM-6 invokes the bit handling subroutine 18. The bit handling subroutine 18 executes bit calculations as bit data processing, for example by carrying out a logical OR and a logical AND or the like between arbitrary bits in a bit stream.

Next, effects of the microcomputer 1 in accordance with this embodiment will be explained.

Figure 4A:
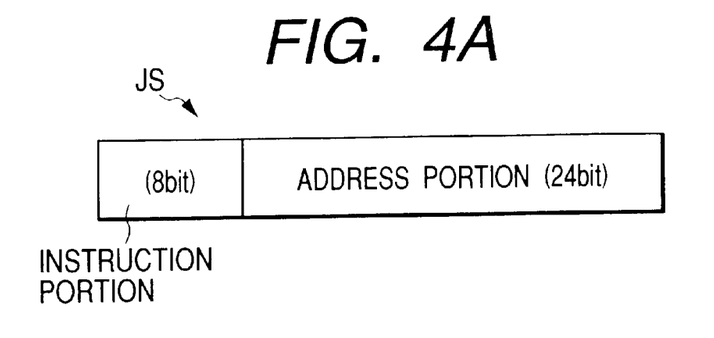
FIG. 4A is a view explaining a data stream of an ordinary branch instruction.
Figure 4B:
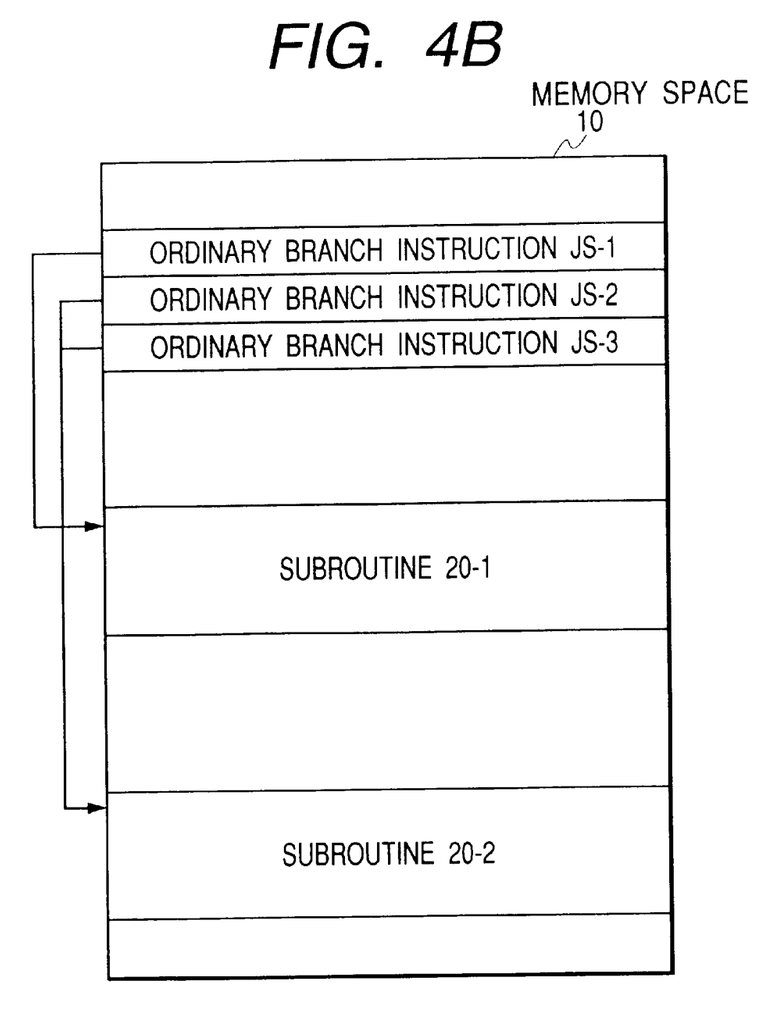
FIG. 4B is a view showing an allocation of ordinary branch instructions.

In addition to the above-described specific area branch instruction "JM", the microcomputer 1 of this embodiment executes an ordinary branch instruction "JS" which invokes a subroutine. As shown in FIG. 4A, the ordinary branch instruction "JS" is a single instruction of 4 bytes consisting of a 8-bit instruction portion and a 24-bit address portion. As shown in FIG. 4B, the ordinary branch instruction "JS" can jump to an arbitrary address in the entire memory space 10. More specifically, an ordinary branch instruction JS-1 invokes a subroutine 20-1. Each of ordinary branch instructions JS-2 and JS-3 invokes another subroutine 20-2.

According to the ordinary branch instruction "JS", its 24-bit address portion is used to designate an arbitrary address in the entire memory space 10 as a branch address. To realize this, the ordinary branch instruction "JS" has an instruction length (4 bytes) which is two times the minimum instruction length.

Figure 5:
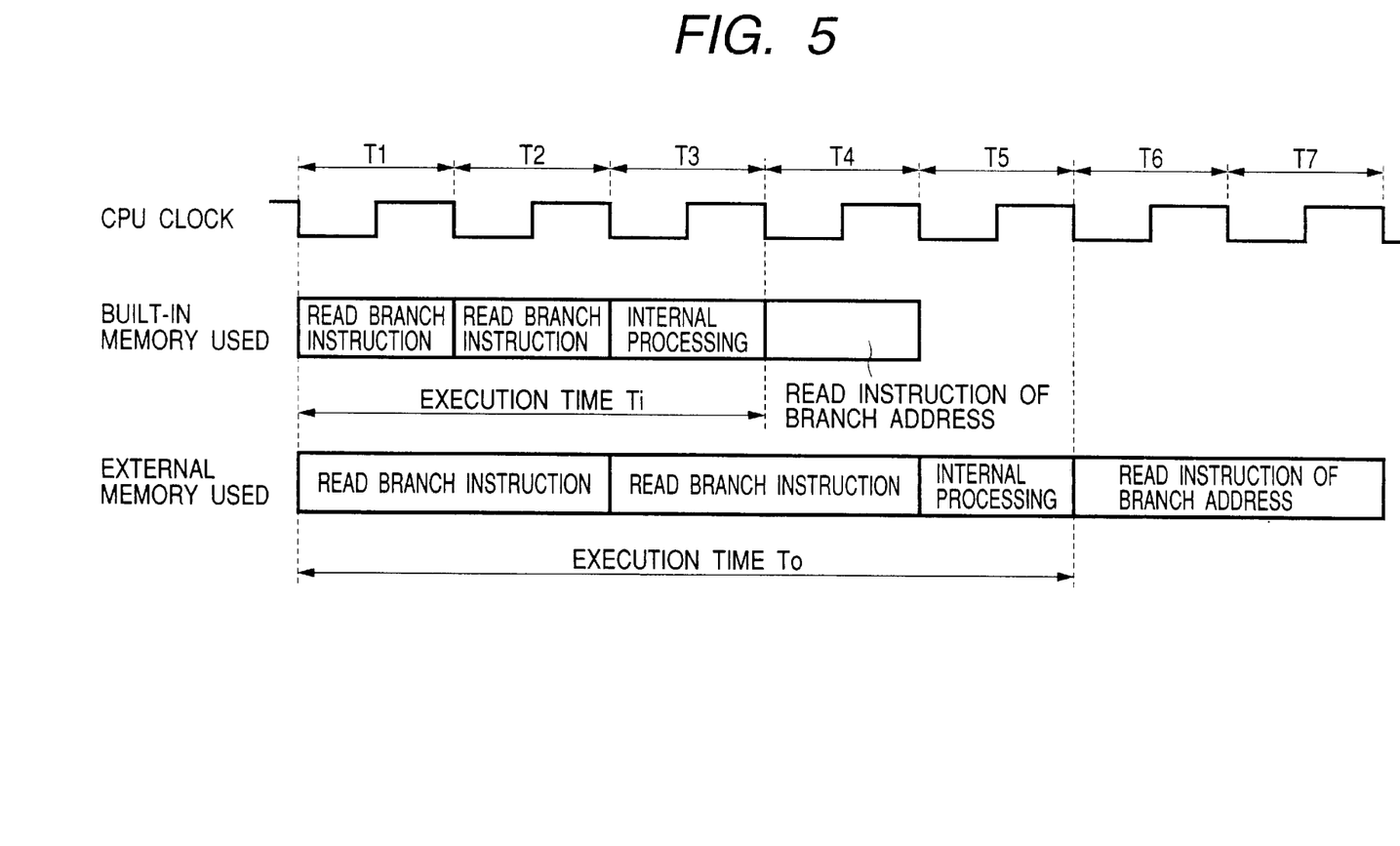
FIG. 5 is a time chart showing an operation of the microcomputer performed for executing the ordinary branch instruction.

FIG. 5 shows an operation of the microcomputer 1 performed for executing the ordinary branch instruction "JS." In FIG. 5, time durations of T1 to T7 respectively show one cycle of an internal clock (i.e., CPU clock) which corresponds to one state (i.e., a basic cycle) in the operation of CPU 2.

The upper first and second lines of FIG. 5 show the operation of the microcomputer 1 under a condition where the programs are stored in the built-in memory 3. In this case, the first state T1 is used for reading the higher-order two bytes of the ordinary branch instruction "JS." The second state T2 is used for reading the lower-order two bytes of the ordinary branch instruction "JS." The third state T3 is used for executing internal processing to decode the ordinary branch instruction "JS" and to calculate the address. The fourth state T4 is used for reading an instruction of a branch address designated by the ordinary branch instruction "JS."

Accordingly, when the programs are stored in the built-in memory 3, an execution time Ti corresponding to a total of three states ranging from T1 to T3 is required to invoke a subroutine in accordance with the ordinary branch instruction "JS."

Alternatively, the programs are storable in the external memory 6. In this case, as shown in the first and third lines of FIG. 5, the first and second states T1 and T2 are used for reading the higher-order two bytes of the ordinary branch instruction "JS." The third and fourth states T3 and T4 are used for reading the lower-order two bytes of the ordinary branch instruction "JS." The fifth state T5 is for executing the internal processing to decode the ordinary branch instruction "JS" and to calculate the address. The sixth and seventh states T6 and T7 are used for reading an instruction of a branch address designated by the ordinary branch instruction "JS."

Accordingly, when the programs are stored in the external memory 6, an execution time To corresponding to a total of five states ranging from T1 to T5 is required to invoke a subroutine in accordance with the ordinary branch instruction "JS." In this case, as the external memory 6 is slow in its response speed compared with that of the built-in memory 3, a longer time equivalent to two consecutive states is required in reading the instruction (more specifically, two-byte data) from the external memory 6. In other words, there is a longer waiting time ranging from a time of outputting the address information to the address bus 4 to a time of accomplishing a reading operation of the required data via the data bus 5. This is equally applied to FIG. 3.

It is now assumed that the real arithmetic subroutine, the integer division subroutine and the bit handling subroutine are allocated to arbitrary areas in the memory space 10 and that, in the program, the ordinary branch instruction "JS" is used to invoke each of the above subroutines. According to this configuration, the 4-byte data equivalent to the ordinary branch instruction "JS" is definitely necessary to invoke each of the above subroutines. An overall program size becomes so large that the built-in memory 3 cannot store all of the necessary programs.

Furthermore, in the case of using the external memory 6 for storing the programs, the execution time To required in invoking each of the real arithmetic subroutine, the integer division subroutine and the bit handling subroutine is not negligible. As described above with reference to FIG. 5, the execution time To is longer than the execution time Ti, where Ti is required in the case of using the built-in memory 3 for storing the programs. Furthermore, to accomplish reading of the ordinary branch instruction "JS", CPU 2 must access the external memory 6 twice (in other words, CPU 2 must execute two instruction reading cycles consecutively). The execution time To becomes longer as the number of access times increases. Therefore, the start timing will be significantly delayed in executing each of the real arithmetic subroutine, the integer division subroutine and the bit handling subroutine. In other words, the of ability to execute each processing will be decreased.

Figure 3:
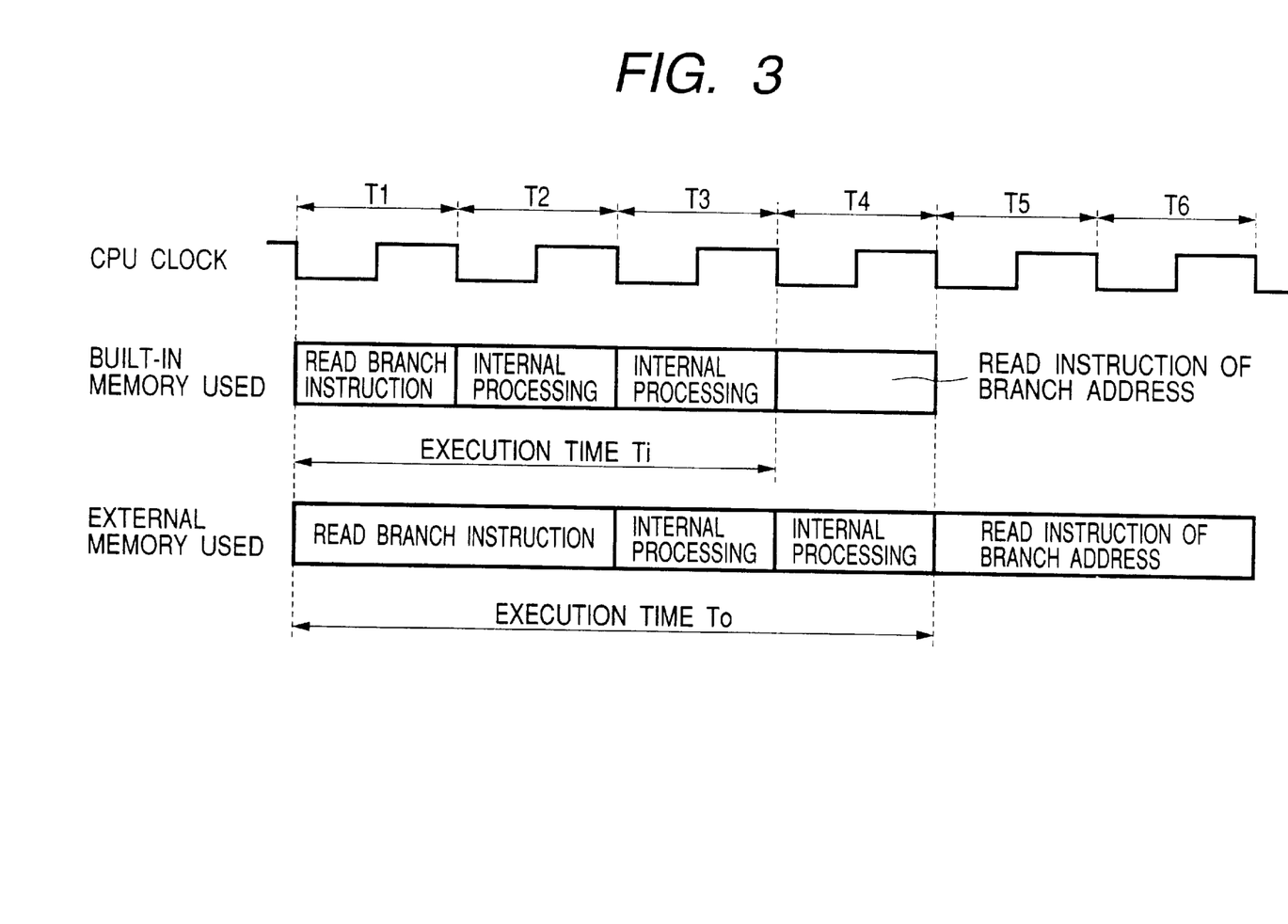
FIG. 3 is a time chart showing an operation of the microcomputer performed for executing the specific area branch instruction in accordance with the preferred embodiment of the present invention.

On the contrary, FIG. 3 shows an operation of the microcomputer 1 of this embodiment performed for executing the specific area branch instruction "JM." In FIG. 3, time durations of T1 to T6 respectively show one cycle of an internal clock (i.e., CPU clock) which corresponds to one state (i.e., a basic cycle) in the operation of CPU 2.

The upper first and second lines of FIG. 3 show the operation of the microcomputer 1 under a condition where the programs are stored in the built-in memory 3. In this case, the first state T1 is used for reading all of the specific area branch instruction "JM." The second and third states T2 and T3 are used for executing internal processing to decode the specific area branch instruction "JM" and to calculate the address. The fourth state T4 is used for reading an instruction of a branch address designated by the specific area branch instruction According to this embodiment, the internal processing uses two states ranging from T2 to T3 because the microcomputer 1 executes the programs based on a so-called "pipeline processing." These two states are dedicated to the pipeline processing so that the pipeline processing can flow smoothly. One of two states T2 and T3 is a dormant period in which no substantial processing is executed, or a waiting period used for executing other instruction.

Accordingly, when the programs are stored in the built-in memory 3, an execution time Ti corresponding to a total of three states ranging from T1 to T3 is required to invoke a subroutine in accordance with the specific area branch instruction "JM."

Alternatively, the programs are storable in the external memory 6. In this case, as shown in the first and third lines of FIG. 3, the first and second states T1 and T2 are used for reading all of the specific area branch instruction "JM." The first and second states T1 and T2 cooperatively constitute a single reading cycle. The third and fourth states T3 and T4 are used for executing the internal processing to decode the specific area branch instruction "JM" and to calculate the address. The fifth and sixth states T5 and T6 are used for reading an instruction of a branch address designated by the specific area branch instruction Accordingly, when the programs are stored in the external memory 6, an execution time To corresponding to a total of four states ranging from T1 to T4 is required to invoke a subroutine in accordance with the specific area branch instruction "JM."

Accordingly, the microcomputer 1 of this embodiment allocates the real arithmetic subroutines 14-1 and 14-2, the integer division subroutine 16, and the bit handling subroutine 18 to the specific area 12 in the memory space 10. The microcomputer 1 can jump to the specific area 12 in response to the specific area branch instruction "JM." Hence, the microcomputer 1 can invoke a corresponding one of the subroutines 14-1, 14-2, 16 and 18 in accordance with each of the specific area branch instructions JM-1 to JM-6 disposed in other routines.

As apparent from the foregoing description, the microcomputer 1 of this embodiment substantially restricts the jump area of the specific area branch instruction "JM" to the specific area 12 in the entire memory space 10. The specific area branch instruction "JM" is configured to be a single instruction having the minimum instruction length, as shown in FIG. 2A. The real arithmetic subroutine, the integer division subroutine, and the bit handling subroutine are allocated to the specific area 12, as shown in FIG. 2B. Each of the real arithmetic subroutine, the integer division subroutine, and the bit handling subroutine is invoked in response to a corresponding one of the specific area branch instructions JM-1 to JM-6.

Accordingly, the microcomputer 1 of this embodiment can reduce the required program size to a level of two bytes corresponding to the minimum instruction length, in invoking any one of the real arithmetic subroutine, the integer division subroutine, and the bit handling subroutine (or in branching to any one of these subroutines). As a result, the microcomputer 1 can reduce the overall program size, thereby enabling its built-in memory 3 to store all of the necessary programs. Alternatively, this embodiment makes it possible to reduce a required storage capacity of the built-in memory 3.

Furthermore, as the specific area branch instruction "JM" has the minimum instruction length, only one access to the memory is necessary to read this instruction "JM". In other words, the reading of the specific area branch instruction "JM" is accomplished within a single instruction reading cycle. When the programs are stored in the external memory 6, the microcomputer 1 of this embodiment can invoke any one of the real arithmetic subroutine, the integer division subroutine, and the bit handling subroutine with a minimum increase of the execution time To. In other words, in starting each subroutine, the microcomputer 1 of this embodiment can suppress a delay time to a minimum level. And, the microcomputer 1 of this embodiment can improve the real time executability in each of the real arithmetic processing, the integer division processing, and the bit arithmetic processing.

The present invention is not limited to the above-described embodiment and therefore can be modified into various forms.

For example, according to the microcomputer 1 of the above-described embodiment, the minimum instruction length is 2 bytes. However, the present invention is similarly applicable to other microcomputers having the minimum instruction length of 1 byte or 4 bytes.

Moreover, the present invention can obtain the above-described effects whenever the program is configured so as to allocate at least one of the real arithmetic subroutine, the integer division subroutine, and the bit handling subroutine to the specific area of the memory.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A microcomputer comprising:

a memory;

processor connected to the memory for executing a specific area branch instruction, said specific area branch instruction being restricted to jump to only a specific area of said memory, being discriminable from other branch instructions that are each set to jump to any arbitrary address in the memory, and being a single instruction having a minimum instruction length relative to all other instructions, said processor further for allocating a selected subroutine to said specific area of said memory, said selected subroutine being a program stored in said memory and selected from one of a real arithmetic subroutine for executing real arithmetic processing, an integer division subroutine for executing integer division processing, and a bit handling subroutine for executing bit data processing, and said memory storing another program that is configured to jump to said selected subroutine allocated to said specific area in response to said specific area branch instruction.

2. The microcomputer according to claim 1, wherein said memory comprises at least one of an internal memory and an external memory.

3. The microcomputer according to claim 1, wherein the specific area branch instruction has a four-bit instruction portion.

4. The microcomputer according to claim 3, wherein the specific area branch instruction further has a twelve-bit address portion.

5. The microcomputer according to claim 1, wherein the specific area branch instruction has an instruction portion with a minimum length of two bytes.

6. The microcomputer according to claim 1, wherein the real arithmetic subroutine further comprises a plurality of real arithmetic subroutines, the specific area branch instruction further comprises a plurality of specific area branch instructions, and one of the plurality of specific area branch instructions invokes one of the plurality of real arithmetic subroutines.

7. The microcomputer according to claim 6, wherein other ones of the plurality of specific area branch instructions respectively invoke other ones of the plurality of real arithmetic subroutines.

8. The microcomputer according to claim 7, wherein yet another of the plurality of specific area branch instructions invokes the integer division subroutine.

9. The microcomputer according to claim 7, wherein another one of the plurality of specific area branch instructions invokes the bit handling subroutine.

10. The microcomputer according to claim 6, wherein the processor invokes one of the plurality of arithmetic subroutines, the integer division subroutine, and the bit handling subroutine in accordance with each of the plurality of specific area branch instructions, wherein the plurality of specific area branch instructions are associated with other routines.

11. The microcomputer according to claim 6, wherein each of the plurality of real arithmetic subroutines, the integer division subroutine, and the bit handling subroutine is invoked in response to a corresponding one of the plurality of specific area branch instructions.

12. The microcomputer according to claim 2, wherein the processor further executes an ordinary branch instruction being set to jump to an arbitrary address in the memory, said ordinary branch instruction being a single instruction having a long instruction length.

13. The microcomputer according to claim 12, wherein the long instruction length is four bytes.

14. The microcomputer according to claim 13, wherein the ordinary branch instruction has an eight-bit instruction portion.

15. The microcomputer according to claim 14, wherein the ordinary branch instruction has a twenty-four bit address portion.

16. The microcomputer according to claim 2, wherein when the programs are stored in the internal memory, an execution time corresponding to three states is required to invoke a subroutine in accordance with the ordinary branch instruction.

17. The microcomputer according to claim 2, wherein when the programs are stored in the external memory, an execution time corresponding to five states is required to invoke a subroutine in accordance with the ordinary branch instruction.

18. The microcomputer according to claim 2, wherein when the programs are stored in the internal memory, an execution time corresponding to three states is required to invoke a subroutine in accordance with the specific branch instruction.

19. The microcomputer according to claim 2, wherein when the programs are stored in the external memory, an execution time corresponding to four states is required to invoke a subroutine in accordance with the specific branch instruction.

* * * * *